Nov. 22, 1960 W. E. DICKINSON 2,961,645
MAGNETIC TRANSDUCER
Filed Sept. 10, 1957
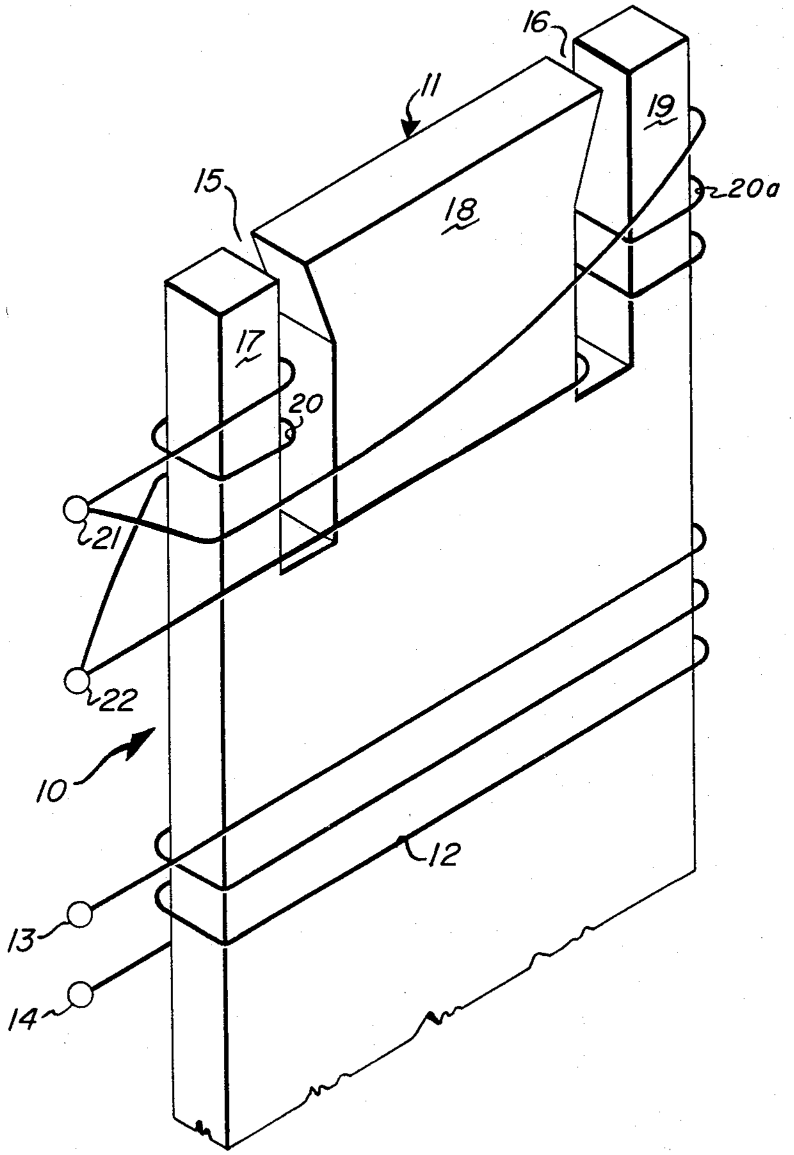
INVENTOR.
WESLEY E. DICKINSON
BY John B. Clark
ATTORNEY United States Patent Office 2,961,645
Patented Nov. 22, 1960

2,961,645

MAGNETIC TRANSDUCER

Wesley E. Dickinson, Santa Clara County, Calif., assignor to International Business Machines Corporation, New York, N.Y., a corporation of New York Filed Sept. 10, 1957, Ser. No. 683,151
7 Claims. (Cl. 340—174.1)

The present invention relates generally to magnetic transducers and pertains more particularly to a "wide-write, narrow-read" magnetic transducer.

In magnetic data storage devices such as shown in the copending application Serial No. 477,468, filed December 24, 1954, in the names of Louis D. Stevens et al., where a transducer is positionable for cooperating with selected tracks of a magnetic record member, problems have arisen when the transducer is repositioned for reading previously recorded data. Unless the transducer is repositioned to the same location (within a given tolerance) transversely of the track as it was when the data was recorded, errors in the detection of the coded signals may result. To this end transducers have been provided for writing along a wider strip of track than is scanned by the transducer for reading purposes. One such transducer adapted to longitudinal magnetic recording is shown in the copending application Serial No. 532,488, filed September 6, 1955, in the name of Wesley A. Holman, now abandoned, wherein the write gap provided in the core of the transducer is wider than the corresponding read gap. This reduces the positioning tolerance required for eliminating errors brought about by inaccuracies in the positioning mechanism.

The present invention is directed to a wide-write, narrow-read transducer adapted for vertical magnetic recording and includes a probe, portions of the width of which are rendered ineffective for reading purposes, the entire width being used for recording purposes. Thus, when the transducer is positioned for recording on a selected track of a record member the width of the recorded signals corresponds to the full width of the probe. For reading purposes, however, a lesser width of the probe is operative and only a portion of the recorded track is sensed thereby.

An object of the invention is to provide an improved wide-write, narrow-read magnetic transducer.

Another object is to provide a wide-write, narrow-read probe type magnetic transducer.

A further object is to provide a probe type magnetic transducer, portions of which are rendered ineffective on reading operations.

Still another object is to provide a magnetic transducer including a probe, the full width of which is operative for recording purposes, but being arranged to utilize only a portion of the width for reading purposes.

Other objects of the invention will be pointed out in the following description and claims and illustrated in the accompanying drawings which disclose, by way of example, the principle of the invention and the best mode which has been contemplated of applying that principle.

The drawing depicts a partial perspective view of an embodiment of the invention.

Referring now to the drawing, the transducer of the invention comprises a probe 10, one end 11 of which is arranged to cooperate with a magnetic record member (not shown). The probe 10 is composed of a suitable low reluctance material and is provided with a read-record winding 12. When recording, suitable signals are connected across the terminals 13 and 14 of the winding for generating a magnetic field in the probe which is utilized to magnetize the record member in the conventional manner according to the signal. When reading previously recorded signals, the magnetic field emanating from the record member enters the low reluctance probe and induces an E.M.F. in the winding 12 corresponding to the recorded signals.

According to the invention, means are provided for reducing the effective width of the probe 10 during reading so that while the transducer is adapted to magnetize a strip of the record member corresponding in width to the full width of the probe 10, it is arranged to respond to only a portion of the width of such a magnetized strip corresponding to a portion of the width of the probe.

To this end the probe is provided with slits 15 and 16 which define three legs 17, 18 and 19. A control winding 20 is arranged to link the leg 17 and another control winding **20*a* is arranged to link the leg 19. The windings 20 and 20*a* are low resistance windings such that when the terminals 21 and 22 connected thereto are short-circuited, these windings act as shorted turns. According to Lenz's law, when the terminals 21 and 22 are shorted together, the current induced in the windings 20 and 20*a* due to the change in the magnetic field entering the legs 17 and 19 flows in such a way as to generate a magnetic field which opposes the change in the magnetic field causing the induced current, thereby effectively increasing the dynamic reluctance of these legs. Thus, when the terminals 21 and 22 are shorted together, the effect of the magnetic field entering the probe is substantially reduced, thereby rendering the legs 17 and 19 of the probe substantially ineffective under this condition. It will be noted, however, that when the windings 20 and 20*a*** are open-circuited, no current flows therein and the whole width of the probe is operative for reading or recording.

In operation when it is desired to write wide and to read narrow, it will be clear that on a write operation the coils 20 and **20*a* are open circuited, thereby rendering the whole width of the probe operative, and the magnetic field generated in response to signals placed across the winding 12 magnetizes a strip along the track of the record member having a width corresponding to the full width of the probe. On read operations, however, the coils 20 and 20a are short-circuited and only a portion of the width of the recorded track corresponding to the width of the leg 18 is scanned since only the magnetic field entering the leg 18 of the probe excites the coil 12**.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. For example, should it be desired to write narrow and read wide, it will be clear that the windings 20 and **20*a*** may be short-circuited on write operations and open-circuited on read operations. It is the intention, therefore, to be limited only as indicated by the scope of the following claims.

What is claimed is:

1. A magnetic transducer comprising a probe for co-operating with a magnetic record track, said probe including two portions arranged transversely of said track, a read winding linking both of said portions for sensing variations in magnetic fields therein, and means including a control winding linking one of said portions for varying the dynamic reluctance of said one portion.

2. A transducer for cooperating with a magnetic record track comprising a probe movable relative to said track longitudinally thereof, said probe including first and second portions disposed transversely of said track, a signal winding linking said first and second portions and control means including a control winding linking one of said portions for rendering said one portion substantially inoperative, whereby the width of said probe cooperating with said track is determined by said control means.

3. A magnetic transducer comprising a probe for cooperating with a magnetic record track, said probe including two portions arranged adjacent each other transversely of said track, a read winding linking both of said portions for sensing variations in magnetic fields therein, and means for varying the dynamic reluctance of one of said portions.

4. A transducer for cooperating with a magnetic record track comprising a probe movable relative to said track longitudinally thereof, said probe having a reading head portion and a writing head portion and including first and second magnetic elements disposed adjacent each other transversely of said track, both of said elements defining said write portion and said first one of said elements defining said read portion, a signal winding linking both of said elements and means for selectively rendering said second one of said elements inoperative, said means including a control winding linking said second one of said elements and means for short circuiting said control winding, whereby said transducer is controlled for writing according to the full width of said elements and for reading according to the width of one of said elements.

5. A magnetic transducer comprising a probe for operating in connection with a track of a magnetic record member, said probe having a width arranged transversely of said track, a first winding linking said probe for cooperating therewith by sensing magnetic fields therein, a second winding linking only a portion of the width of said probe, and means for shortcircuiting said second winding for increasing the dynamic reluctance of said linked portion for reducing the effective width of said probe cooperating with said track.

6. A magnetic transducer for cooperating with a track on a magnetic record member comprising a low reluctance probe for connecting magnetic fields between said track and a first winding, said probe having first and second portions disposed adjacent each other in a plane transversely of said track for forming a gap between said track and said first winding, said first winding linking both said first and second portions for sensing magnetic fields therein, a second winding linking only said first portion, and means for short circuiting said second winding for increasing the reluctance of said second portion and reducing the effect on said first winding of the magnetic field entering said first portion from said track, whereby the effective width of said gap is controlled by short circuit means.

7. A magnetic transducer for cooperating with a magnetic record track comprising a magnetic core, said core including a first leg, second and third legs disposed on either side of said first leg in a plane which includes said first leg and which traverses said record track, said first, second and third legs being disposed adjacent said track but having a high reluctance gap therebetween for connecting magnetic flux between said track and a first winding, said first winding linking said first, second and third legs, a second winding linking said first and third legs, and means for selectively short circuiting said second winding on read operations for increasing the reluctance of said second and third legs and selectively reducing the effective width of said core by reducing the effectiveness of said second and third legs in conveying magnetic flux between said record and said first winding.

References Cited in the file of this patent

UNITED STATES PATENTS

| | | |
|---|---|---|
| 2,092,024 | Rowe | Sept. 7, 1937 |
| 2,456,767 | Camras | Dec. 21, 1948 |
| 2,736,776 | Camras | Feb. 28, 1956 |